United States Patent
Gu et al.

(10) Patent No.: US 9,544,853 B1
(45) Date of Patent: Jan. 10, 2017

(54) METHOD AND SYSTEM FOR SELECTIVELY ACTIVATING A VEHICLE NEAR FIELD COMMUNICATION MODULE

(71) Applicant: GM Global Technology Operations LLC, Detroit, MI (US)

(72) Inventors: Wen Gu, Novi, MI (US); Amanda J. Kalhous, Ajax (CA); Karen Juzswik, Ypsilanti, MI (US)

(73) Assignee: GM Global Technology Operations LLC, Detroit ( * ) Notice: Subject to any disclaimer, the term of this patent is extended or adjusted under 35 U.S.C. 154(b) by 0 days.

(21) Appl. No.: 15/075,549

(22) Filed: Mar. 21, 2016

(51) Int. Cl.
| | |
|---|---|
| *H04W 4/00* | (2009.01) |
| *H04W 52/02* | (2009.01) |
| *H04B 5/00* | (2006.01) |
| *H04W 76/02* | (2009.01) |
| *H04W 76/04* | (2009.01) |
| *H04B 1/3822* | (2015.01) |

(52) U.S. Cl.
CPC ....... *H04W 52/0261* (2013.01); *H04B 1/3822* (2013.01); *H04B 5/0031* (2013.01); *H04W 4/008* (2013.01); *H04W 76/023* (2013.01); *H04W 76/046* (2013.01)

(58) Field of Classification Search
CPC .............................................. B60R 2325/103
See application file for complete search history.

(56) References Cited

U.S. PATENT DOCUMENTS

| | | | | |
|---|---|---|---|---|
| 7,912,441 B2 * | 3/2011 | Von Bosch | ......... | H04M 1/7253 455/343.1 |
| 7,929,910 B2 * | 4/2011 | Chen | ......... | H04B 5/02 455/343.1 |
| 8,112,066 B2 * | 2/2012 | Ben Ayed | ......... | G06Q 20/108 455/41.1 |
| 8,798,809 B2 | 8/2014 | Kalhous | | |
| 8,818,569 B2 | 8/2014 | Oakes | | |
| 8,989,660 B2 * | 3/2015 | Sabouri | ......... | H04B 5/00 326/16 |
| 9,358,940 B2 * | 6/2016 | Cooper | ......... | B60R 16/037 |
| 9,428,127 B2 * | 8/2016 | Cooper | ......... | B60R 16/037 |

* cited by examiner

*Primary Examiner* — David Bilodeau
(74) *Attorney, Agent, or Firm* — Reising Ethington, P.C.; Christopher Devries

(57) ABSTRACT

A method and system for selective activation of a vehicle near field communication (NFC) module. The vehicle NFC module may be part of a vehicle communication and access system capable of initiating various vehicle functions, such as unlocking one or more doors of the vehicle or starting a motor or engine of the vehicle. With the method and system, a user's mobile device can be used in lieu of a key or a key fob. In situations where the battery power level of the user's mobile device is low, such that Bluetooth or the generation of an active NFC signal is unavailable, the vehicle NFC module is maintained in an active mode. In the active mode, the vehicle NFC module can initiate a connection with a passive mobile NFC target. Otherwise, depending on the battery level of the user's mobile device, the vehicle NFC module is maintained in a standard sleep mode to save power.

17 Claims, 2 Drawing Sheets

METHOD AND SYSTEM FOR SELECTIVELY ACTIVATING A VEHICLE NEAR FIELD COMMUNICATION MODULE

FIELD

The present invention generally relates to vehicle communication and access systems, and more particularly, to selectively activating one or more vehicle near field communication (NFC) modules of a vehicle communication and access system.

BACKGROUND

With certain vehicle communication and access systems, such as Passive Keyless Entry (PKE) systems or Passive Entry Sleep Start (PEPS) systems, Bluetooth Low Energy (BLE) is oftentimes used to gain access to the vehicle or various vehicle functionalities with a user's mobile device. However, if the battery of the mobile device dies, a backup may be needed if the user is without a key or a key fob. Accordingly, a vehicle NFC module may be used as an active initiator and a mobile NFC device may be used as a passive target in situations when the use of BLE, a key, or a key fob is unavailable or undesirable. However, it is preferable to keep the vehicle NFC module in a sleep mode to conserve vehicle power. The system and method described herein address dynamic controlled selective activation of the vehicle NFC module such that it is only in an active mode during times when the battery level of the mobile device is at or below a threshold battery level.

SUMMARY

According to one embodiment, there is provided a method of selectively activating a vehicle near field communication (NFC) module. The method involves receiving a first mobile device battery signal indicating that a battery power level of a mobile device is at or below a threshold battery power level. In response to receiving the first mobile device battery signal indicating that the battery power level of the mobile device is at or below a threshold battery power level, the vehicle NFC module is changed to an active mode. The method further involves receiving a second mobile device battery signal indicating that the battery power level of the mobile device is above the threshold battery power level. In response to receiving the second battery signal indicating that the battery power level of the mobile device is above the threshold battery power level, the vehicle NFC module is changed to a sleep mode.

According to another embodiment, there is provided a method of selectively activating a vehicle NFC module. The method involves pairing a mobile device with a vehicle communication and access system, and wirelessly transmitting a first mobile device battery signal to a remote server. The first mobile device battery signal indicates that a battery power level of the previously paired mobile device is at or below a threshold battery power level. In response to wirelessly transmitting the first mobile device battery signal to the remote server, an activation signal is sent from the remote server to change the vehicle NFC module from a standard sleep mode to an active mode. When the previously paired mobile device is within the range of the vehicle NFC module and the vehicle NFC module is in the active mode, an NFC signal is sent from the vehicle NFC module to a mobile NFC module of the previously paired mobile device to activate the vehicle communication and access system.

According to another embodiment, there is provided a vehicle communication and access system comprising a control unit having a processor and memory and a NFC module coupled to the control unit. The memory of the control unit is configured to store a recognizable code for a previously paired mobile device. The control unit is configured to receive a first mobile device battery signal, the first battery power signal indicating that a battery power level of the previously paired mobile device is at or below a threshold battery power level. In response to receiving the first mobile device battery signal indicating that the battery power level of the previously paired mobile device is at or below the threshold battery power level, the control unit is configured to change the mode of the vehicle NFC module from sleep to active.

DRAWINGS

Preferred exemplary embodiments will hereinafter be described in conjunction with the appended drawings, wherein like designations denote like elements, and wherein.

DESCRIPTION

There is disclosed herein a communication and access system for a vehicle and a method of selectively activating a vehicle near field communications (NFC) module of a vehicle communication and access system. A vehicle NFC module may be used with a mobile NFC module of a user's mobile device to enable or initiate various vehicle functions. For example, in lieu of a key, a key fob, or a Bluetooth device, NFC may be used to unlock and/or start the vehicle. The system and method described herein provides for dynamic control of a vehicle's NFC mode depending on the battery level of a user's mobile device. This dynamically controlled selective activation of a vehicle NFC module can ensure that the vehicle communication and access system is available when the battery of the mobile device dies. Furthermore, dynamic control can selectively keep the vehicle NFC module in a default sleep mode to save energy, while maintaining the accessibility of the vehicle communication and access system.

Figure 1:
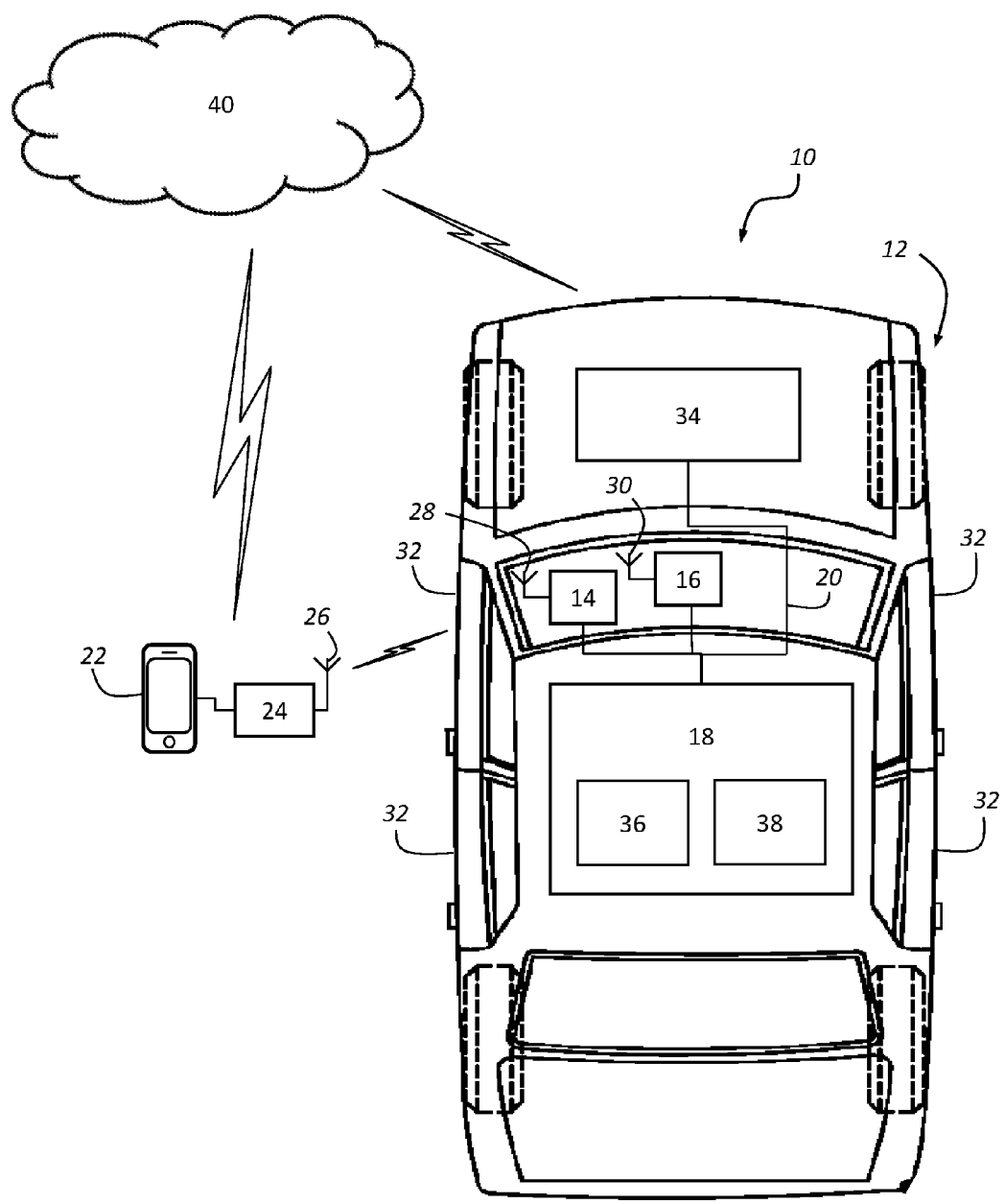
FIG. 1 is a schematic diagram of a vehicle communication and access system.

Turning now to FIG. 1, there is shown a schematic illustration of a communication and access system 10 for a vehicle 12. The communication and access system 10 includes a first vehicle NFC module 14. Also, but not necessarily, a second vehicle NFC module 16 is depicted in this particular implementation of the communication and access system 10. But, it is possible to only have a single vehicle NFC module, or more than two vehicle NFC modules, as described in further detail below. The first and second vehicle NFC modules 14, 16 are shown as being schematically connected to a control unit 18 via vehicle bus 20; however, it should be appreciated that the first and/or second vehicle NFC modules 14, 16 may have their own integrated control unit or may be connected to one or more control units in any operable fashion, such as being hard-wired, implemented with a wireless connection, or connection via an intermediate device, unit, or module, etc.

The first and/or second vehicle NFC modules 14, 16 are preferably an NFC chipset or NFC transceiver, capable as acting as an initiator or as a target. The first and/or second vehicle NFC module 14, 16 interacts with a user's mobile device 22 which has its own mobile NFC module 24, illustrated schematically in FIG. 1. Mobile device 22 may be any type of portable electronic device, such as a cellular telephone, a smart phone, tablet, etc. The mobile NFC module 24 has a mobile NFC antenna 26, the first vehicle NFC module 14 has a first vehicle NFC antenna 28, and the second vehicle NFC module 16 has a second vehicle NFC antenna 30. As addressed above, the first and/or second vehicle NFC modules 14, 16 preferably act as an initiator and a target. The initiator actively generates an RF current, generating an electromagnetic field that can power a passive target. The initiator device provides a carrier field, and the target device answers by modulating the existing field. The target device may draw its operating power from the initiator-provided electromagnetic field, and accordingly, if the battery of the mobile device 22 is very low or dead, the vehicle NFC modules 14, 16 can provide operating power to the mobile NFC module 24 to initiate a connection with the vehicle communications and access system 10.

Further, the first and/or second vehicle NFC module 14, 16 may be operable in an active mode or a sleep mode. In an active mode, just the vehicle NFC module 14, 16 or both the vehicle NFC module 14, 16 and the mobile NFC module 24 of the mobile device 22 can generate an RF signal on which data may be carried. The active mode includes low power operation when the vehicle NFC module polls for other NFC modules within range and a normal operation when one or more other NFC modules are detected. In a sleep mode, the vehicle NFC module 14, 16 is the target, using load modulation to transfer data back to the mobile NFC module 24 initiator. The first and/or second vehicle NFC module 14, 16 may use any operable communication mode such as read/write, card emulation, or peer-to-peer. Furthermore, any workable standardization protocol may be employed, and any viable signal coding scheme may be used.

The first vehicle NFC module 14 is schematically illustrated as being near a vehicle identification number (VIN) plate and configured to lock or unlock one or more vehicle doors 32. In another preferred embodiment, the first vehicle NFC module 14 is located in a handle of one or both of the vehicle doors 32. The maximum NFC range is approximately 10 cm, and accordingly, it is desirable for locking and/or unlocking purposes to have the first vehicle NFC module 14 at or near the exterior of the vehicle 12. Other locations for the first vehicle NFC module 14 are certainly possible. For example, a vehicle NFC module may be placed at or near one or more side mirrors, or near the trunk lid to provide access to the trunk. The second vehicle NFC module 16 is schematically illustrated as being near a dashboard of the vehicle 12. The second vehicle NFC module 16 may be configured, for example, to start an engine or a motor 34 of the vehicle 12. In one implementation, the second vehicle NFC module 16 is integrated with a docking station in a center console of the vehicle 12. Other locations for vehicle NFC modules are certainly possible.

Particularly with respect to the first vehicle NFC module 14, it is preferable if the NFC module is in a standard sleep mode. When the battery of the mobile device 22 is in a good state, the vehicle NFC module functionality will be disabled in the standard sleep mode, meaning that the vehicle NFC module will not consume any power. In the active mode, and more particularly, during low power operation, the vehicle NFC module 14 typically polls for other NFC modules every 500 ms, and the power consumption is approximately 150 μA. Accordingly, about 150 μA may be saved by keeping the vehicle NFC module in a standard sleep mode. While this amount of power saved over time may not be considered particularly significant (e.g., about 36 mAh for 10 days), the power savings of a standard sleep mode is quite significant when malicious NFC modules and normal operation of the active mode are considered. When the vehicle NFC module detects the presence of another NFC module, the vehicle NFC module switches to normal operation to read the other NFC module, and the power consumption goes up to about 50-100 mA. Thus, if the vehicle NFC module is in an active mode, there is a possibility that a malicious NFC module (i.e., not the user's mobile device 22) can be placed near the vehicle NFC module 14 and turn it from low power operation to normal operation. In this case, the power consumption over time can be significant (e.g., about 12-24 Ah for 10 days) which accounts for 25-50% of a typical vehicle battery. The presence of malicious mobile devices and NFC modules may be of particular concern in more urban or commercialized areas, for example.

Control unit 18 may be used to control, govern, or otherwise manage certain operations or functions of vehicle 12 and/or one or more components or modules thereof (e.g., vehicle communications and access system 10 or vehicle NFC module 14, 16). Preferably, although not illustrated for simplicity purposes, each vehicle NFC module 14, 16 has its own integrated control unit 18 which can then communicate with one or more other vehicle units or modules wirelessly (e.g., via Bluetooth) or via vehicle bus 20 or another connection. In an exemplary embodiment, control unit 18 includes a processor 36 and memory 38. Processor 36 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory 38 may include any type of suitable electronic memory means and may store a variety of data and information. This includes, for example: one or more recognizable codes of the mobile device 22; information about the battery level of mobile device 22, whether obtained directly from the mobile device 22 or from a remote server 40, or indirectly through a telematics unit or another vehicle module, for example; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory 38 such that control unit 18 may be configured to perform one or more steps of the method described in greater detail below. In another preferred embodiment, the present method—as well as any other electronic instructions and/or information needed for such tasks—may be stored remotely, such as at the remote server 40. Control unit 18 may be electronically connected to other vehicle devices and modules via I/O devices and suitable connections, like communications bus 20, so that they can interact as required. Further, the control unit 18 need not be electrically connected within the vehicle communication and access system 10 as shown in FIG. 1. These are, of course, only some of the possible arrangements, functions, and capabilities of control unit 18, as others are certainly possible. Depending on the particular embodiment, control unit 18 may be a stand-alone electronic module (e.g., a door control module), it may be incorporated or included within another electronic module in the vehicle (e.g., a body control module, telematics unit, etc.), or it may be part of a larger network or system, to name a few possibilities. As addressed above, it is also possible to include a specific control unit for each NFC module included in the communications and access system 10. As an example, a more centralized control unit 18 (either a stand-alone unit or a unit integrated with another device such as a telematics unit) may transmit information pertaining to the mobile device to a control unit that is specific to or integrated with the vehicle NFC module 14. Other operable configurations and arrangements are certainly possible.

The remote server 40 may be used in one or more embodiments of the method and system described herein to facilitate the transmission of various information regarding the mobile device 22, and more particularly, information regarding the battery power level of the mobile device 22. The remote server 40 may transmit information to the control unit 18 or to other vehicle components such as a telematics unit which then relays the information to the control unit 18. In a preferred embodiment, the remote server 40 is a cloud-based server. Cloud-based servers are scalable (e.g., easy and fast to upgrade), economical, and have flexible capacity which is typically capable of being better tailored to user demand. Other implementations for the remote server 40 are certainly possible. For example, the remote server 40 may be located at a call center or the like. Alternatively, the remote server 40 may be omitted altogether and the mobile device 22 may transmit information directly to the vehicle 12, such as to the control unit 18 or a telematics unit, for example.

Figure 2:
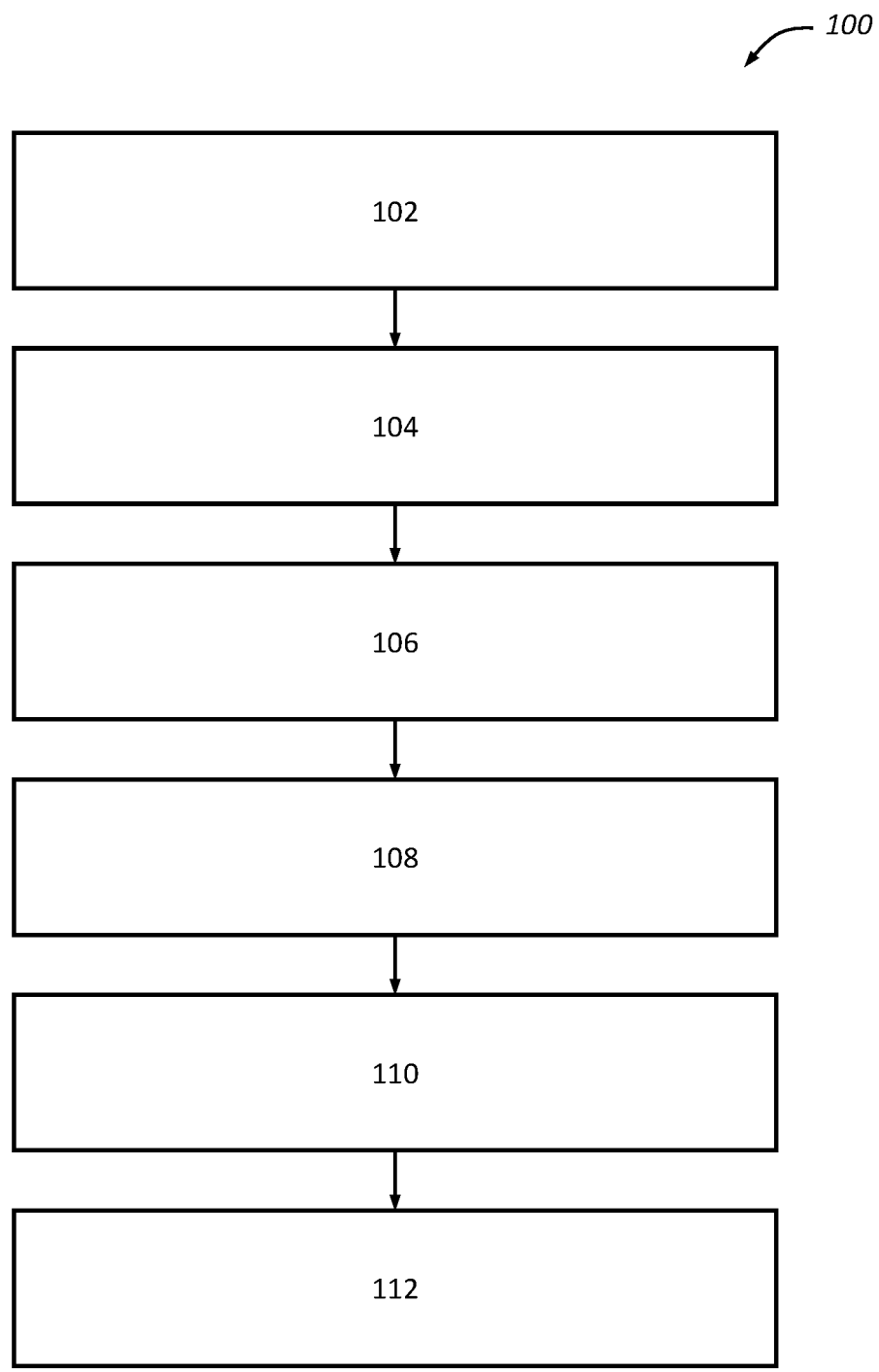
FIG. 2 is a flowchart of an exemplary method that may be used with the vehicle communication and access system of FIG. 1.

Turning to FIG. 2, there is a flowchart illustrating the steps of a method 100 of selectively activating a vehicle NFC module. The method 100 may be used with one or more vehicle NFC modules, such as the vehicle NFC modules 14, 16 of the vehicle communication and access system 10 depicted in FIG. 1. Further, it is possible to execute the method 100 with more than one mobile device. For example, one user could have multiple mobile devices that work with method 100, or multiple users may each have one or more mobile devices that work with method 100. For exemplary purposes, the method 100 is described in conjunction with the mobile device 22 of FIG. 1 and the first vehicle NFC module 14 of the vehicle communications and access system 10.

Step 102 of the method 100 involves pairing a mobile device 22 with a vehicle communications and access system 10. Pairing the mobile device 22 involves any method wherein the vehicle 12 is able to recognize the user's mobile device 22 as opposed to a malicious mobile device. Pairing may involve making an NFC or Bluetooth connection with or without menu navigation on either the vehicle 12 or the mobile device 22. In one example, the mobile device 22 has a recognizable code, such as a device address or more particularly a Bluetooth device address, that can be stored in memory 38 of the control unit 18. In one embodiment, pairing of the mobile device 22 with the vehicle communications and access system 10 is accomplished indirectly via an initial pairing between the mobile device 22 and another vehicle system, such as an infotainment system or the like. In another embodiment, a recognizable code of the mobile device 22 is sent to the control unit 18 or another vehicle module such as a telematics unit from a remote server 40. Other pairing methods are certainly possible.

Step 104 involves receiving a first mobile device battery signal indicating that a battery power level of the mobile device 22 is at or below a threshold battery power level. In other words, the battery power level of the mobile device 22, represented by the first mobile device battery signal, is compared with a threshold battery power level. The first mobile device battery signal may be sent by an application-based program on the mobile device 22. In one particular embodiment, the first mobile device battery signal is wirelessly transmitted to the remote server 40. The first mobile device battery signal may be received at the control unit 18, directly from the mobile device 22, indirectly from the mobile device 22 via remote server 40 and to the control unit 18 or to a telematics unit, to cite a few examples.

The threshold battery power level is any battery power level indicating that it would be desirable to change the vehicle NFC module 14 to an active mode to ensure accessibility to the vehicle communication and access system 10. The threshold battery power level may be a static or dynamic threshold. A static threshold may be based on remaining battery capacity. For example, the threshold battery power level may be about 10% of remaining battery capacity. The threshold battery power level may also be a dynamic threshold that changes based on battery usage. For example, the threshold battery power level may be an estimate of remaining battery time based on current battery usage. In one particular example, the threshold battery power level is about five minutes of remaining battery time based on current battery usage. The dynamic battery power level threshold takes into account situations where a user may have a large number of application programs or the like running. In such situations, 10% battery capacity may decrease at a much more substantial rate than in situations where the user has only a few application programs consuming battery power. Further, with respect to either a static or dynamic threshold battery power level, the "at or below" requirement is meant to provide clarity, and does not necessarily limit the systems or methods to embodiments where the first mobile device battery signal is sent once the battery level is below a threshold level. If, for example, a method was designed wherein the first mobile device battery signal was sent when the battery power level was below a threshold battery power level of 10%, then in this embodiment, the threshold battery power level would be about 9% or 9.99% depending on the desired precision or particularity.

In response to receiving the first mobile device battery signal in step 104, the vehicle NFC module 14 is changed to an active mode in step 106. In one embodiment, an activation signal may be sent from the mobile device 22 or from the remote server 40 to change the vehicle NFC module 14 from a standard sleep mode to an active mode. As addressed above, the active mode typically consists of low power operation and normal operation. During low power operation, the vehicle NFC module 14 polls for other NFC modules every 500 ms. Normal operation occurs when another NFC module is detected, whether it be the mobile NFC module 24 of the mobile device 22 or any another NFC module. If the battery of the mobile device 22 is at or below the threshold battery power level, accessibility to the vehicle communication and access system 10 is ensured because the mobile NFC module 24 of the mobile device 22 can act as a passive target. In situations where the battery power level of the mobile device 22 is low but not necessarily dead, NFC may be used as an alternative to Bluetooth systems which would need a higher battery power level in order to facilitate data transmission. In situations where the battery of the mobile device 22 is dead, the antenna 28 of the vehicle NFC module 14 can induce a voltage in the mobile NFC module 24 via the mobile NFC antenna 26 to facilitate data transmission between the vehicle NFC module 14 and the mobile NFC module 24.

Step 108 involves receiving a second mobile device battery signal indicating that a battery power level of the mobile device 22 is above the threshold battery power level. As with the first mobile device battery signal, the second mobile device battery signal may be sent by an application-based program on the mobile device 22. In one particular embodiment, the second mobile device battery signal is wirelessly transmitted to the remote server 40. The second mobile device battery signal may be received at the control unit 18, directly from the mobile device 22, indirectly from the mobile device 22 via remote server 40 and to the control unit 18 or to a telematics unit, to cite a few examples. The designations "first" and "second" battery signals are used for clarity purposes and are not meant to be limiting or indicate a certain temporal requirement. For example, the method is meant to encompass a scenario wherein an initially received mobile device battery signal indicates that the battery power level is above the threshold, thereby triggering a change to a sleep mode (e.g., the second mobile device battery signal). Continuing with the example, a mobile device battery signal that is subsequently received may indicate that the battery power level is at or below a threshold to trigger a change to an active mode (e.g., the first mobile device battery signal).

In response to receiving the second mobile device battery signal in step 108, the vehicle NFC module 14 is changed to a sleep mode in step 110. In one embodiment, a deactivation signal may be sent from the mobile device 22 or from the remote server 40 to change the vehicle NFC module from the active mode to a standard sleep mode. In the standard sleep mode, the functionality of vehicle NFC module 14 is at least partially disabled, such that the vehicle NFC module 14 becomes a target, and the mobile NFC device 24 can act as an initiator to activate the vehicle communication and access system 10. In a standard sleep mode, the power consumption savings over time can be significant, particularly because normal operation can be avoided when malicious NFC modules come within range of the vehicle NFC module. For example, with a standard sleep mode, 12-24 Ah for 10 days can be saved, which may account for 25-50% of the capacity of a typical vehicle battery.

Step 112 involves sending an NFC signal from the mobile NFC module 24 of the previously paired mobile device 22 to the vehicle NFC module 14 to activate the vehicle communication and access system 10. As addressed above, the typical range of NFC devices is about 10 cm at its maximum. Accordingly, in the embodiment illustrated in FIG. 1, when the vehicle NFC module 14 and the mobile NFC module 24 of the mobile device 22 are within a range of about 10 cm or less, the vehicle communication and access system 10 is activated. In one embodiment, the vehicle NFC module 14 is located at or near the VIN plate and is configured to unlock one or more vehicle doors 32. In another preferred embodiment, the vehicle NFC module 14 is located in a door handle and is configured to unlock one or more vehicle doors 32. Preferably, the standard sleep mode involves sending an NFC signal from the mobile NFC module 24 to the vehicle NFC module 14 when the battery power level of the mobile device 22 is above the threshold battery power level. However, as previously addressed, when in an active mode, an NFC signal may be sent from the vehicle NFC module 14 to the mobile NFC module 24 when the battery power level of the mobile device 22 is at or below the threshold battery power level. It should be understood that it is also possible for the mobile NFC module 24 to still send an NFC signal when the battery power level of the mobile device is below the threshold level (e.g., both the mobile NFC module 24 and the vehicle NFC module 14 are in an active mode capable of generating an RF signal on which data may be carried, despite the low battery power level of the mobile device 22).

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of selectively activating a vehicle near field communication (NFC) module, the method comprising the steps of:
receiving a first mobile device battery signal indicating that a battery power level of a mobile device is at or below a threshold battery power level;
in response to receiving the first mobile device battery signal indicating that the battery power level of the mobile device is at or below the threshold battery power level, changing the vehicle NFC module to an active mode;
receiving a second mobile device battery signal indicating that the battery power level of the mobile device is above the threshold battery power level; and
in response to receiving the second battery signal indicating that the battery power level of the mobile device is above the threshold battery power level, changing the vehicle NFC module to a sleep mode.

2. The method of claim 1, wherein the threshold battery power level is a dynamic threshold that changes based on battery usage.

3. The method of claim 2, wherein the threshold battery power level is representative of an estimate of remaining battery time based on current battery usage.

4. The method of claim 3, wherein the threshold battery power level is representative of about five minutes of remaining battery time based on current battery usage.

5. The method of claim 1, wherein the threshold battery power level is a static threshold based on remaining battery capacity.

6. The method of claim 5, wherein the threshold battery power level is representative of about 10% remaining battery capacity.

7. The method of claim 1, wherein the vehicle NFC module is located in a vehicle door handle and configured to lock or unlock one or more vehicle doors.

8. The method of claim 1, wherein the vehicle NFC module is located near a vehicle identification number (VIN) plate and configured to lock or unlock one or more vehicle doors.

9. The method of claim 1, wherein the vehicle NFC module is located in a center console and configured to start an engine or a motor of the vehicle.

10. The method of claim 1, further comprising the step of sending an NFC signal from the vehicle NFC module to a mobile NFC module of the mobile device to activate the vehicle communication and access system when the mobile device is within a range of the vehicle NFC module and the vehicle NFC module is in the active mode.

11. A method of selectively activating a vehicle near field communication (NFC) module, the method comprising the steps of:
pairing a mobile device with a vehicle communication and access system;
wirelessly transmitting a first mobile device battery signal to a remote server, wherein the first mobile device battery signal indicates that a battery power level of the previously paired mobile device is at or below a threshold battery power level;
in response to wirelessly transmitting the first mobile device battery signal to the remote server, sending an activation signal from the remote server to change the vehicle NFC module from a standard sleep mode to an active mode; and
when the previously paired mobile device is within a range of the vehicle NFC module and the vehicle NFC module is in the active mode, sending an NFC signal from the vehicle NFC module to a mobile NFC module of the previously paired mobile device to activate the vehicle communication and access system.

12. The method of claim 11, further comprising the steps of:
wirelessly transmitting a second mobile device battery signal to the remote server, wherein the second mobile device battery signal indicates that a battery power level of the previously paired mobile device is above the threshold battery power level; and
in response to wirelessly transmitting the second mobile device battery signal to the remote server, sending a deactivation signal from the remote server to change the vehicle NFC module from the active mode to the standard sleep mode.

13. The method of claim 11, wherein the active mode of the vehicle NFC module includes low power operation and normal operation, wherein low power operation has a power consumption of about 150 µA and normal operation has a power consumption of about 50-100 mA.

14. The method of claim 13, wherein the standard sleep mode of the vehicle NFC module has a power consumption savings of about 12-24 Ah for 10 days.

15. The method of claim 11, wherein the remote server is a cloud-based server.

16. A vehicle communication and access system comprising:
a control unit having a processor and memory, wherein the memory is configured to store a recognizable code for a previously paired mobile device; and
a vehicle near field communication (NFC) device coupled to the control unit, wherein the control unit is configured to receive a first mobile device battery signal, the first battery power signal indicating that a battery power level of the previously paired mobile device is at or below a threshold battery power level, and in response to receiving the first mobile device battery signal indicating that the battery power level of the previously paired mobile device is at or below the threshold battery power level, the control unit is configured to change the mode of the vehicle NFC module from sleep to active.

17. The vehicle communication and access system of claim 16, wherein the control unit is further configured to receive a second mobile device battery signal, the second battery power signal indicating that the battery power level of the previously paired mobile device is above the threshold battery power level, and in response to receiving the second mobile device battery signal indicating that the battery power level of the previously paired mobile device above the threshold battery power level, the control unit is configured to change the mode of the vehicle NFC module from active to sleep.

* * * * *